(12) United States Patent
Nakazono et al.

(10) Patent No.: US 6,296,122 B1
(45) Date of Patent: *Oct. 2, 2001

(54) PACKAGING TRAY

(75) Inventors: Tsugio Nakazono, Yao; Akira Murakami, Yamatokoriyama, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,123

(22) Filed: Oct. 16, 1998

(30) Foreign Application Priority Data

Nov. 14, 1997 (JP) ................................................. 9-314007
Aug. 6, 1998 (JP) ................................................. 10-223408

(51) Int. Cl.⁷ ................................................. B65D 85/30
(52) U.S. Cl. ........................ 206/707; 206/511; 206/725
(58) Field of Search .................................. 206/701, 706, 206/707–709, 722–728, 509, 511

(56) References Cited

U.S. PATENT DOCUMENTS

| 4,872,557 | * | 10/1989 | Ames | 206/509 |
| 5,103,976 | * | 4/1992 | Murphy | 206/719 |
| 5,400,904 | | 3/1995 | Maston, III et al. | |
| 5,890,599 | * | 4/1999 | Murphy | 206/725 |

FOREIGN PATENT DOCUMENTS

| 2322849 | 9/1998 | (GB) . |
| 08324674 | 12/1996 | (JP) . |
| 09315487 | 12/1997 | (JP) . |
| 242874 | 11/1995 | (TW) . |
| 83211160 | 11/1995 | (TW) . |
| 317859 | 11/1997 | (TW) . |
| 85205014 | 11/1997 | (TW) . |
| WO 95 19916 A | 7/1995 | (WO) . |

* cited by examiner

Primary Examiner—Luan K. Bui
(74) Attorney, Agent, or Firm—David G. Conlin; William J. Daley, Jr.; Dike, Bronstein, Roberts and Cushman

(57) ABSTRACT

Position determining concave portions for determining, when a plurality of packaging trays are stacked, a stacking position of each packaging tray with respect to at least another packaging tray placed above or beneath are provided. Each bottom portion of the position determining concave portion in the depth direction is made slightly smaller than the opening portion of the same. Consequently, when a plurality of the packaging trays are stacked, the bottom portions of the position determining concave portions of the upper packaging tray slightly fit into the opening portions of the corresponding position determining concave portions of the lower packaging tray through point contact or linear contact, whereby the stacking position of the upper packaging tray with respect to the lower packaging tray is determined fixedly.

6 Claims, 14 Drawing Sheets

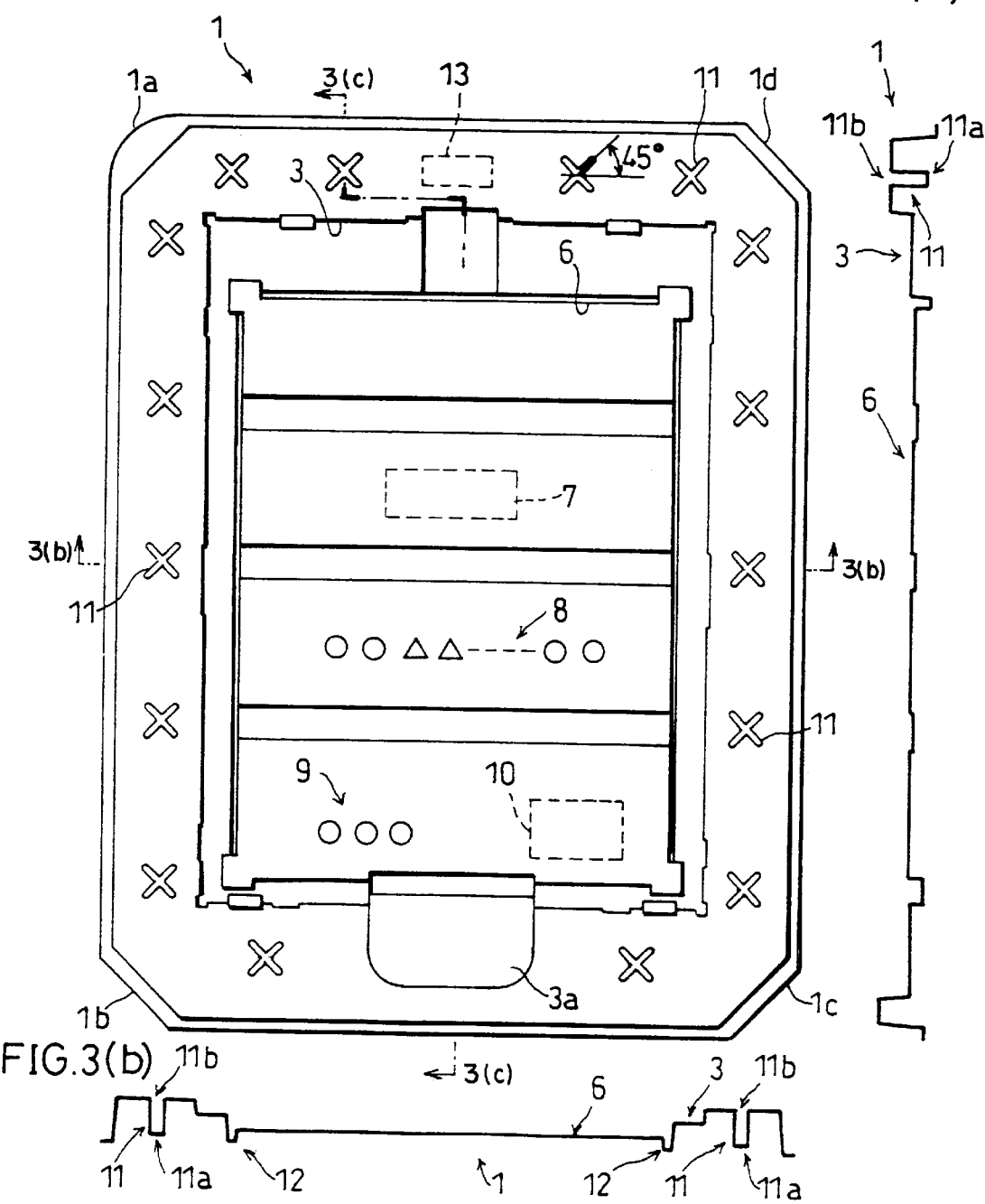

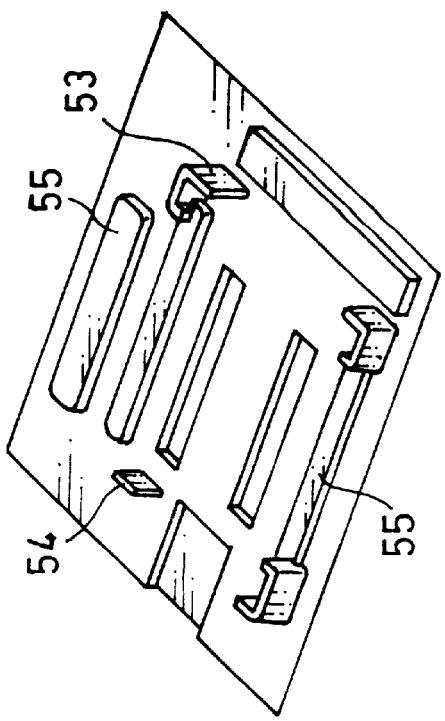
FIG.12 (b) PRIOR ART
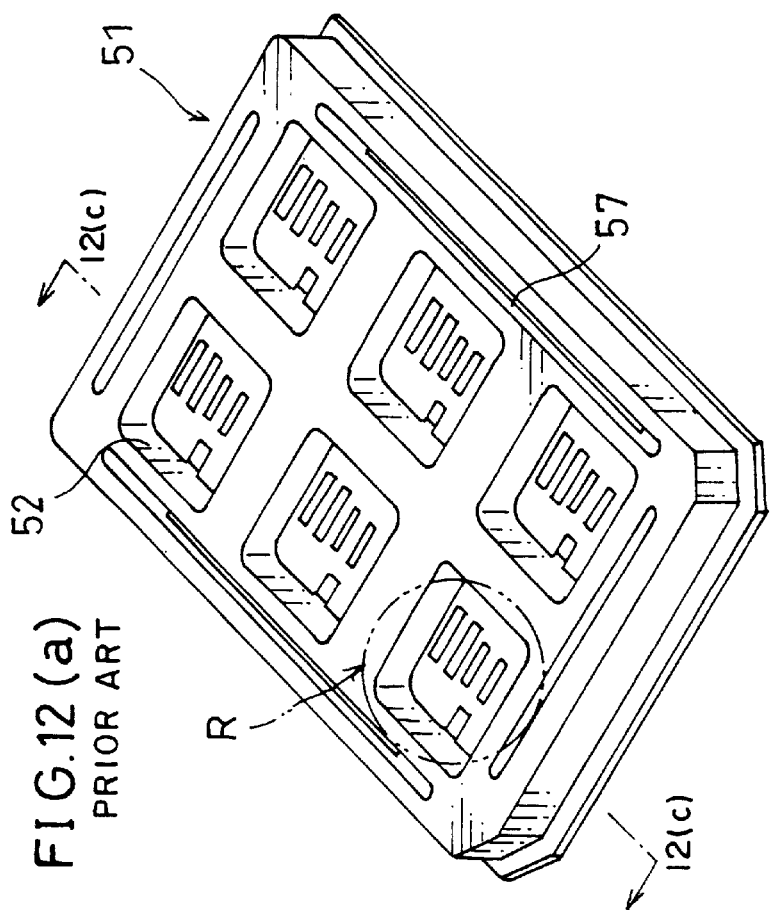
FIG.12 (a) PRIOR ART
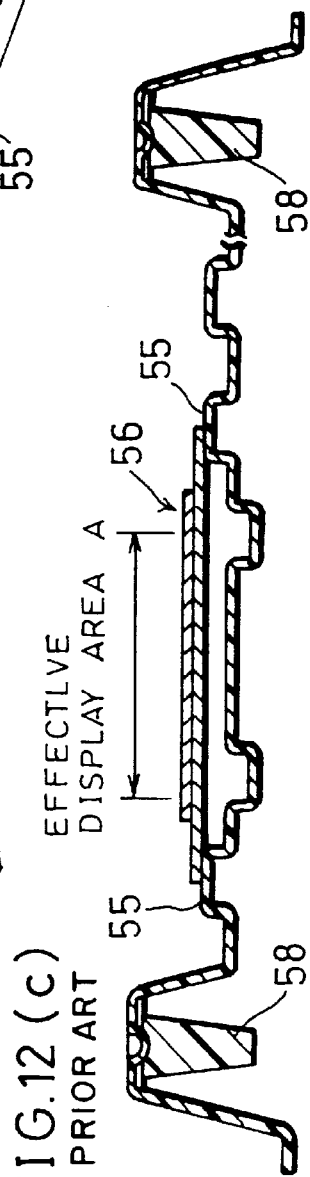
FIG.12 (c) PRIOR ART

PACKAGING TRAY

FIELD OF THE INVENTION

The present invention relates to a packaging tray used for packaging a display element employed in electronic equipment, an OA (Office Automation) terminal, an advertisement display device, etc.

BACKGROUND OF THE INVENTION

Conventionally, a packaging tray is used to package a display element, such as an LC (Liquid Crystal) panel. To transport assembled individual display elements, at least one display element is placed in each packaging tray, then the packaging trays are stacked in layers and sealed in a corrugated cardboard box. When the display elements are transported while being held in the packaging trays in the above manner, the damages to the display elements during the transportation can be minimized.

Well-known examples of the conventional packaging trays used for the transportation include:

① molded articles made of non-foam materials using a vacuum molding cast;

② molded articles made of foam materials, such as Styrofoam; and

③ assemblages of corrugated plastic or polyethylene foam.

The examples also include a packaging tray disclosed in, for example, Japanese Laid-open Patent Application No. 324674/1996 (Tokukahei No. 8-324674). The packaging tray disclosed in the above publication has a lid-wise outside shape, so that a plurality of the packaging trays can be readily stacked in layers, which will be explained more in detail in the following.

As shown in FIG. 12(*a*), a packaging tray 51 disclosed in the above publication is made of a conductive material prepared by blending carbon with polystyrene or vinyl chloride, which is made into a lid-wise shape using a cast.

The packaging tray 51 includes a plurality of display element holding concave portions 52. A portion indicated by a capital letter R in FIG. 12(*a*) is depicted in FIG. 12(*b*) illustrating an enlarged bottom portion of one display element holding concave portion 52. As shown in the drawing, the display element holding portion 52 includes corner stoppers 53, a side surface stopper 54, and holders 55.

The corner stoppers 53 touch three out of four corners of an LC panel 56 (see FIG. 12(*c*)) to set these corners at their respective right positions. On the other hand, the side surface stopper 54 touches one side surface near the remaining corner to set the LC panel 56 to a right position. Therefore, the LC panel 56 is held at a predetermined position inside the packaging tray 51 by being set in the right position with the corner stoppers 53 and side surface stopper 54.

As shown in FIG. 12(*c*) illustrating a sectional view taken on line 12(*c*)—12(*c*) of FIG. 12(*a*), the holders 55 hold the LC panel 56 by receiving the same on the back surface at a portion outside an effective display area A of the LC panel 56. Accordingly, the damages to a polarizing plate placed inside the effective display area A of the LC panel 56 can be prevented.

Also, as shown in FIG. 12(*a*), a rib 57 having a concave cross section is provided along the edge of each side of the packaging tray 51 on the surface thereof, whereby the warpage of the packaging tray 51 while the packaging tray 51 is molded or the LC panels 56 are held in the display element holding concave portions 52 can be prevented.

On the other hand, as shown in FIG. 13, spacers 58 are provided on the back surface of the packaging tray 51 at a portion where the display element holding concave portions 52 are not formed, that is, at the corners and almost at the center of the packaging tray 51. The spacers 58 touch the surface of another packaging tray 51 placed beneath when a plurality of the packaging trays 51 are stacked in layers vertically.

FIG. 14 illustrates a plurality of the packaging trays 51 stacked in layers vertically. In the drawing illustrating the cross section, the spacers 58 of the upper packaging tray 51 seem to have fitted into the ribs 57 of the lower packaging tray 51, but in practice, the spacers 58 of the upper packaging tray 51 only touches the surface of the lower packaging tray 51, which is apparent from the position of the spacers 58 with respect to the ribs 57 shown in FIGS. 12(*a*) and 13.

Since the spacers 58 are provided on the back surface of the packaging tray 51, when a plurality of the packaging trays 51 are stacked in layers vertically, an adequate space is secured between the LC panels 56 held in the lower packaging tray 51 and the upper packaging tray 51, thereby preventing physical contact between the LC panels 56 and upper packaging tray 51. Consequently, it has become possible to prevent a load from being applied on the surface of the LC panels 56 held in the packaging tray 51, and therefore, the damages to the LC panels 56 can be eliminated.

However, since the spacers 58 provided on the back surface of the upper packaging tray 51 only touch the surface of the lower packaging tray 51, the stacking position of the lower packaging tray 51 with respect to the upper packaging tray 51 is not fixed. Thus, the packaging trays 51 stacked in the above manner move apart or displaced from each other due to the vibrations caused during the transportation of the LC panels 56. This reveals that the stacking position can not be controlled by merely making the packaging trays 51 into a lid-wise shape, and therefore, it is impossible to prevent the displacement of the stacked packaging trays 51 by so doing.

Thus, according to the arrangement of the above publication, the stacked packaging trays 51 can not be maintained in a stable manner. Consequently, while the LC panels 56 are transported, the packaging trays 51 are displaced from each other, which causes the sliding, chipping, or cracking of the LC panels 56, thereby posing a problem that a non-conforming ratio rises.

SUMMARY OF THE INVENTION

It is therefore an object of the present invention to provide a packaging tray which can avoid the damages to a display element held therein caused by the displacement of the stacked packaging trays during the transportation.

To achieve the above and other objects, a packaging tray of the present invention, which has a lid-wise outside shape and a plurality of which can be stacked in layers while each holding at least one display element, is characterized by having:

at least one display element holding concave portion for holding the display element; and a position determining portion, provided near each side of the packaging tray, for, when a plurality of packaging trays are stacked, fixedly determining a stacking position of each packaging tray with respect to at least one of other packaging trays placed above and beneath.

According to the above arrangement, the packaging tray has a lid-wise outside shape, and a plurality of the same can be stacked in layers while each holding at least one display element in the display element holding concave portion.

Here, since the position determining portion is provided near each side of the packaging tray (in case that the packaging tray has one display element holding concave portion, the position determining portions are provided around the same), the stacking position of the packaging tray with respect to the packaging tray(s) placed above and/or beneath can be determined fixedly. Consequently, the stacked packaging trays can be maintained in a stable manner, and they are not displaced relatively from each other due to the vibrations during the transportation.

Thus, the above arrangement makes it possible to prevent the sliding, chipping, cracking, etc. of the display elements held in the stacked packaging trays caused by the displacement of the stacked packaging trays during the transportation of the display elements, thereby suppressing an increase of a non-conforming ratio.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a plan view of the packaging tray;

FIG. 3(b) is a sectional view taken on line 3(b)—3(b) of FIG. 3(a);

FIG. 3(c) is a sectional view taken on line 3(c)—3(c) of FIG. 3(a);

FIG. 12(a) is a perspective view schematically illustrating an arrangement of a conventional packaging tray;

FIG. 12(b) is an enlarged perspective view of a bottom portion of a display element holding concave portion provided to the conventional packaging tray;

FIG. 12(c) is a sectional view taken on line 12(c)—12(c) of FIG. 12(a);

DESCRIPTION OF THE EMBODIMENTS
EMBODIMENT 1

Referring to FIGS. 1 through 5, the following description will describe an example embodiment of the present invention.

Figure 1:
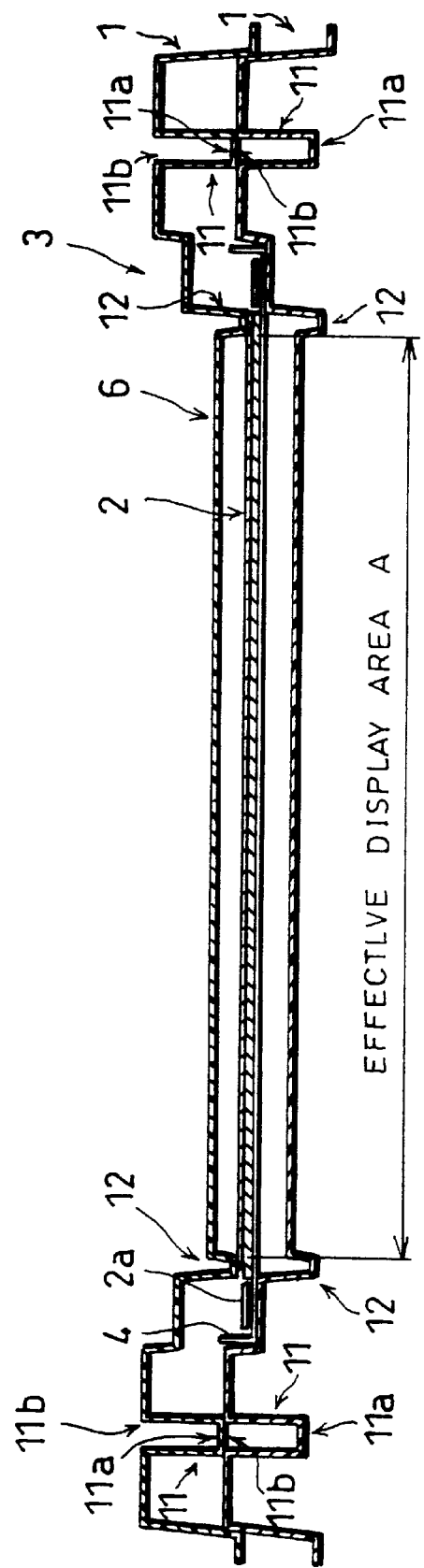
FIG. 1 is a cross section when a plurality of packaging trays in accordance with an example embodiment of the present invention are stacked in layers.
Figure 2:
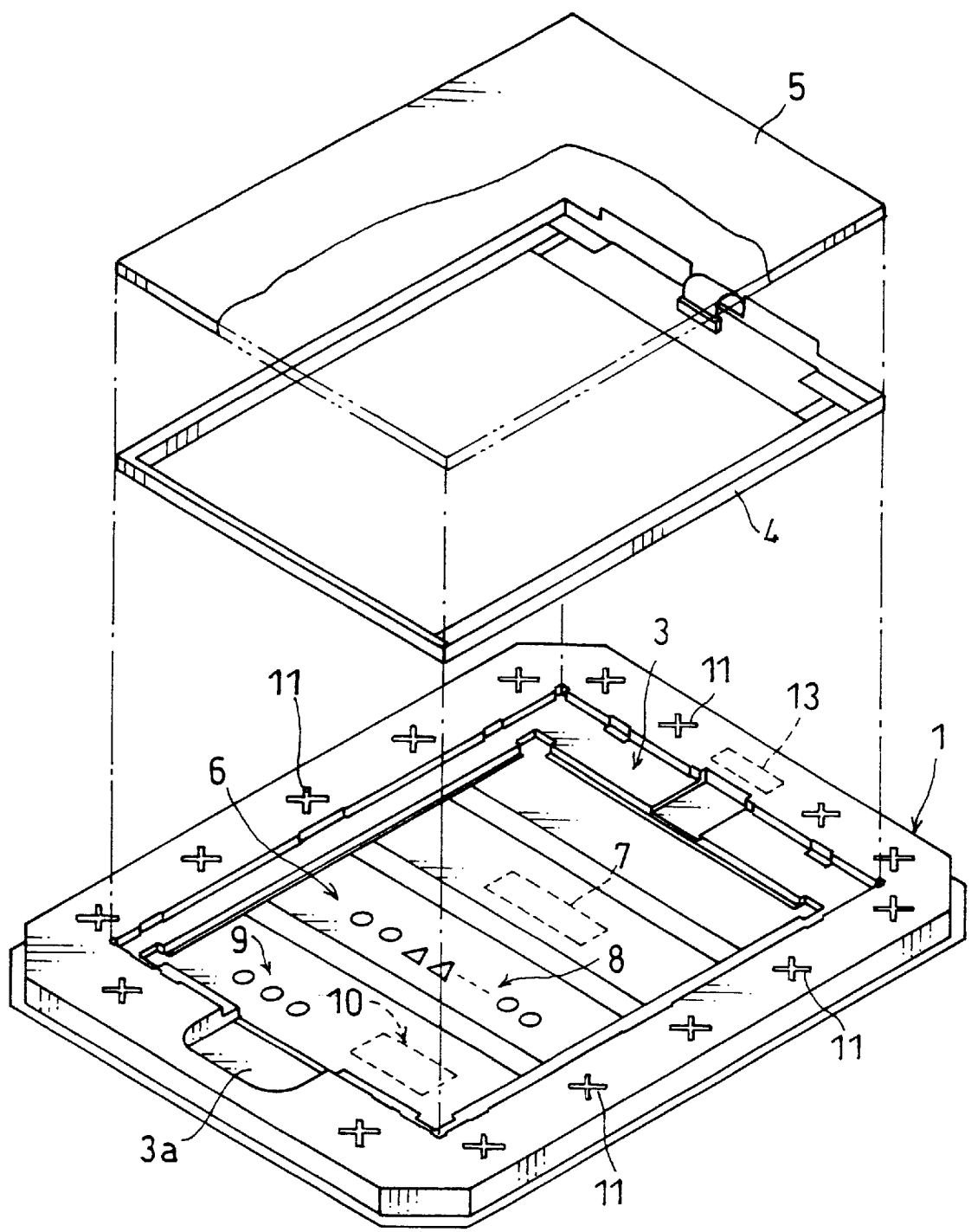
FIG. 2 is a perspective view of the packaging tray which can hold one LC panel.

As shown in FIG. 2, a packaging tray 1 of the present embodiment is made to have a lid-wise outside shape, so that the packaging trays 1 are stacked in layers while each holds a display element, namely, an LC panel 2 (see FIG. 1).

The packaging tray 1 is molded in the following manner. That is, a thermoplastic sheet is softened with heating, and made into a shape which can hold a subject element (at least the LC panel 2). While the sheet is soft, an external force (vacuum, air pressure, etc) is applied, after which the sheet is cooled and solidified.

In the present embodiment, the package tray 1 is made of polystyrene and has a thickness of 1mm or so. However, the material and thickness of the package tray 1 are not limited to the above disclosure. The reason why the packaging tray 1 is made of polystyrene in the present embodiment is because:

① polystyrene has cushioning properties that prevent the formation of concavities on a polarizing plate of the LC panel 2 under a high pressure or the occurrence of color irregularities due to a change in cell gap;

② predetermined vibration test and dropping test reveal that the sliding, chipping or cracking of the LC panel 2 does not occur when polystyrene is used; and ③ polystyrene is an environmentally benign material.

Also, the packaging tray 1 is almost black, and for this reason, external light is absorbed by the packaging tray 1 before it reaches the LC panel 2. Thus, deterioration of the display quality of the LC panel 2 caused by the external light can be avoided.

Next, an arrangement of the packaging tray 1 will be explained more specifically in the following.

The packaging tray 1 includes an LC panel holding concave portion 3 (display element holding concave portion) for holding the LC panel 2. In the present embodiment, the LC panel holding concave portion 3 is formed to hold one LC panel 2 and a peripheral circuit board 2a (see FIG. 1). Moreover, the LC panel holding concave portion 3 includes a removal concave portion 3a, so that the LC panel 2 held therein can be readily removed. As shown in the drawing, the removal concave portion 3a is provided at a short side of the LC panel holding concave portion 3 in the present embodiment. However, the removal concave portion 3a can be provided at a long side instead.

In the present embodiment, the LC panel 2 and peripheral circuit board 2a are placed fixedly to a bezel 4 in a predetermined direction, and the bezel 4 is placed directly into the LC panel holding concave portion 3. The bezel 4 referred to herein is an outside case made of, for example, a metal plate for holding and protecting the LC panel 2 and peripheral circuit board 2a.

To enhance the holding properties of the packaging tray 1 with respect to the LC panel 2, a fixing sheet 5 can be fitted into the LC panel holding concave section 3 to cover the LC panel 2. The fixing sheet 5 also prevents the rattling of the LC panel 2 held in the second packaging tray 1 from the top in a space between an empty packaging tray 1 on the top (the packaging tray 1 holding no LC panel 2) and the second packaging tray 1 from the top.

A peripheral component holding concave portion 6 for holding peripheral components of the LC panel 2 is provided inside the LC panel holding concave portion 3. As shown in FIG. 3 (c) illustrating an end view taken on line 3(c)—3(c) of FIG. 3(a), the bottom surface of the peripheral component holding concave portion 6 is levelled to prevent the warpage of the packaging tray 1 that readily occurs when the bottom surface is flat.

As shown in FIG. 3(a), a caution 7, a component code 8, a date of manufacture 9, and a recycle-material 10 are displayed on the bottom surface of the peripheral component holding concave portion 6.

The caution 7 indicates precautions which should be taken by a worker when handling the packaging tray 1, and it can be, for example, "CAUTION: ELECTROSTATIC SENSITIVE DEVICES". The component code 8 is a unique code number assigned to each packaging tray 1.

The date of manufacture 9 indicates the date when the packaging tray 1 is manufactured using a combination of a 2-digit number and one alphabet, for example. The 2-digit number represents the latter half of the year and the alphabet represents the month of the date of manufacture . Here, capital letters A to L are assigned to January to December, respectively. Thus, when the date of manufacture 9 indicates "97G", it means that the packaging tray 1 in question is manufactured in July, 1997.

The date of manufacture 9 is attached to the packaging tray 1 to notify the user of the validity (one year) of the packaging tray 1 using an anti-static agent.

The recycle-material 10 indicates a mark that shows the packaging tray 1 is recyclable and specifies the material of the packaging tray 1. The recycle-material 10 are indicated by an SPI code and an ISO code.

The SPI code is composed of, for example, the aforementioned mark and an auxiliary code specifying the material of the packaging tray 1. The auxiliary codes are represented by numerals 1 to 7, which respectively correspond to: polyethylene terephthalate (PETE), high density polyethylene (HDPE), vinyl chloride (V), low density polyethylene (LDPE), polypropylene (PP), polystyrene (PS), and other materials (OTHER). On the other hand, the ISO code indicates the material of the packaging tray 1 using the above material codes placed inside the parentheses. In the present embodiment, since the packaging tray 1 is made of polystyrene, the material auxiliary code and the material code are "6" and "PS", respectively.

As shown in FIGS. 3(a) through 3(c), a plurality of position determining concave portions 11 (position determining portions) are provided around the LC panel holding concave portion 3 on the surface of the packaging tray 1, whereby, when a plurality of the packaging trays 1 are stacked, the stacking position of the packaging tray 1 with respect to at least another packaging tray 1 placed above or beneath is determined fixedly.

Each position determining concave portion 11 is illustrated as a cross in the plan view, and it has a concavity in the depth direction in the same shape. As is shown in FIGS. 3(b) and 3(c), the bottom portion 11a of each position determining concave portion 11 at an end of the depth direction is slightly smaller than an opening portion 11b of the same, and the side surfaces of the same is substantially perpendicular with respect to the surface of the packaging tray 1.

Figure 4A:
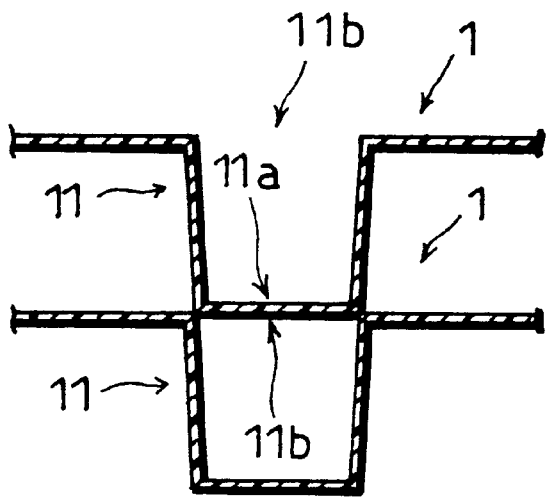
FIG. 4(a) is a cross section illustrating an example arrangement of position determining concave portions provided to the packaging tray.

Accordingly, as shown in FIGS. 1 and 4(a), when a plurality of the packaging trays 1 are stacked, the bottom portion 11a of each position determining concave portion 11 of the upper packaging tray 1 fits into the opening portion 11b of the corresponding position determining concave portion 11 of the lower packaging tray 1 through point contact or almost linear contact. Consequently, the stacking position of the upper packaging tray 1 with respect to the lower packaging tray 1 is determined fixedly.

Since the side surfaces of the position determining concave portion 11 are substantially perpendicular with respect to the surface of the packaging tray 1, the bottom portion 11a of the position determining concave portion 11 does not fit into the opening portion 11b of the corresponding position determining concave portion 11 completely. Thus, according to the above arrangement, the upper packaging tray 1 does not overlap the lower packing tray 1 precisely, and the upper packaging tray 1 keeps a spacing, almost as long as a length in the depth direction of the position determining concave portion 11 from the lower packaging tray 1.

Therefore, the upper and lower packaging trays 1 can keep a predetermined spacing by means of the position determining concave portions 11 provided in each. As a consequence, a lesser of a load is applied onto the LC panels 2 while they are held in the stacked packaging trays or transported under these conditions. In addition, the spacing between the upper and lower packaging trays 1 can be adjusted by changing the length of the position determining concave portions 11 in the depth direction.

The position determining concave portion 11 is made into a cross in the plan view because the cross composed of four arm portions is the optimal shape when the readiness (work efficiency) in separating the stacked packaging trays 1 and the position fixing properties of the packaging tray 1 are concerned. More specifically, the bottom surface area of the cross position determining concave portion 11 can be reduced as much as possible compared with circular or triangular position determining concave portions 11 of the same size, and the stacked packaging trays 1 can be readily separated. On the other hand, the cross shape composed of four radial arm portions can prevent the displacement of the packaging trays 1, especially in the horizontal direction, in a reliable manner. In other words, by making the position determining concave portion 11 into the cross in a plane view, the packaging tray 1 can satisfy the readiness in separation and the position fixing properties while improving the work efficiency in a secure manner.

It should be appreciated that the position determining concave portion 11 can be a star shape, a linear shape, etc. in a plan view as long as the same effect can be attained.

Figure 4B:
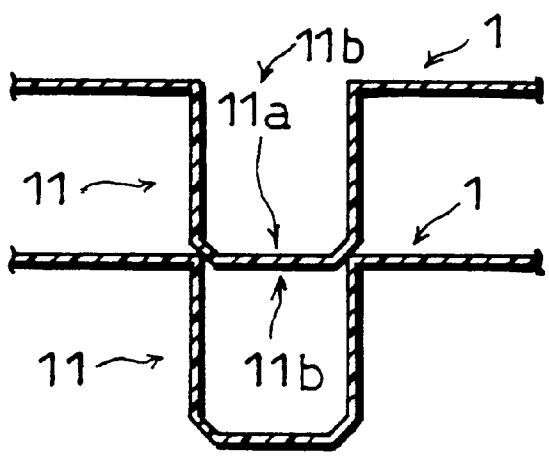
FIG. 4(b) is a cross section illustrating another arrangement of the position determining concave portions.
Figure 4C:
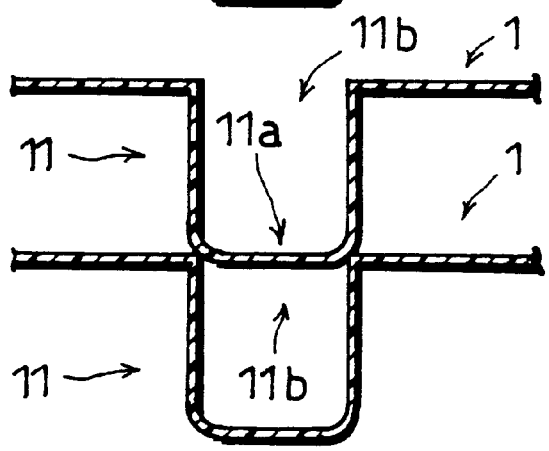
FIG. 4(c) is a cross section illustrating still another arrangement of the position determining concave portions.

The shape of the position determining concave portion 11 in cross section is not limited to the one shown in FIG. 4(a). For example, as shown in FIGS. 4(b) and 4(c), the side surfaces of the position determining concave portion 11 may be formed completely perpendicular with respect to the surface of the packaging tray 1, and the corners of the position determining concave portion 11 may be formed polygonal or circular arc.

As shown in FIG. 1, the packaging tray 1 of the present embodiment includes panel pressing portions 12 (display element pressing portion). The panel pressing portions 12 are formed to protrude downward from the back surface of the peripheral component holding concave portion 6, so that, when a plurality of the packaging trays 1 are stacked, the panel pressing portions 12 press against the LC panel 2 held in the LC panel holding concave portion 3 of the lower packaging tray 1 at the outside portion of the effective display area A.

According to the above arrangement, the holding properties of the packaging tray 1 with respect to the LC panel 2 during the transportation, especially those in the vertical direction, can be improved. Consequently, the occurrence of deficiency of the LC panel 2 during the transportation due to the vibration impact in the vertical direction can be eliminated in a reliable manner, and the safety of the LC panel 2 during the transportation can be enhanced. In addition, since the panel pressing portions 12 press against the LC panel 2 at the outside portion of the effective display area A, for example, the polarizing plate provided inside the effective display area A is not damaged at all, and therefore, the display characteristics of the LC panel 2 can be maintained.

Figure 5:
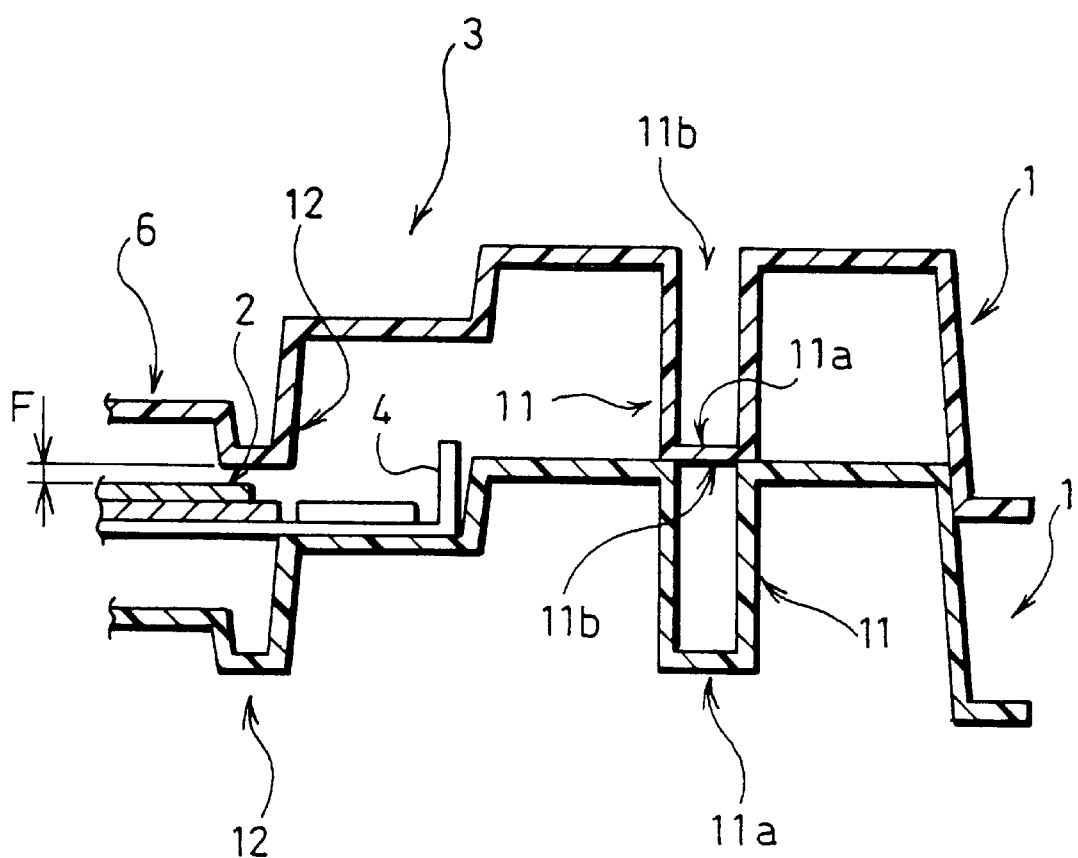
FIG. 5 is a cross section illustrating a state that, when the packaging trays are stacked in layers, the bottom portion of a panel pressing portion of an upper packaging tray keeps a very small space from an LC panel held in a lower packaging tray.

Alternatively, as shown in FIG. 5, the length of the position determining concave portion 11 in the depth direction may be set so that a plurality of the packaging trays 1 are stacked in such a manner that the bottom portion of each panel pressing portion 12 of the upper packaging tray 1 keeps a very small space F (for example, 0.3 mm or so) from the outside portion of the effective display area A of the LC panel 2 held in the lower packaging tray 1, in other words, in such a manner that the upper packaging tray 1 does not touch the LC panel 2 held in the lower packaging tray 1. In this case, when an external force (stress) is applied from above to the packaging trays 1 stacked in layers for some reason, the stress is not conveyed to the LC panel 2 through the panel pressing portions 12 (in this case, the stress is absorbed by the position determining concave portions 11 in both the upper and lower packaging trays 1). Consequently, the cracking, chipping, deformation, color irregularities, etc. of the LC panel 2 caused by the external stress can be prevented.

As shown in FIG. 3(a), an LC panel positioning mark 13 is attached on the surface of the packaging tray 1 in a portion other than the LC panel holding concave portion 3 and position determining concave portions 11, whereby the position of the LC panel 2, held in the LC panel holding concave portion 3 in a predetermined direction, is determined. The display on the LC panel 2 is driven by two substrates respectively having common and segment directions, and when an abbreviation of one of the directions, for example, "COM" is indicated as the LC panel positioning mark 13, the position of the LC panel 2 inside the LC panel holding concave portion 3 can be set in a reliable manner, and it never happens that the LC panel 2 is held in a wrong direction.

Three corners 1b, 1c, and 1d of the packaging tray 1 are cut diagonally to improve the impact resistance, and the remaining corner 1a is formed round, so that it can be used as a position alignment mark when a plurality of the packaging trays 1 are stacked.

In the above arrangement, when the LC panel 2 is placed in the packaging tray 1 to be transported, as shown in FIG. 2, the peripheral components of the LC panel 2 are placed in the peripheral component holding concave portion 6 first, and thence the LC panel 2 is placed in the LC panel holding concave portion 3. Here, the LC panel 2 and the peripheral circuit board 2a are fixed to the bezel 4 in such a manner that the main surface of the LC panel 2 faces downward. Then, the bezel 4 is placed directly in the LC panel holding concave portion 3 with reference to the LC panel positioning mark 13, so that the LC panel 2 is held therein in the predetermined direction. Further, the fixing sheet 5 may be fit into the LC panel holding concave portions 3 to cover the LC panel 2, so that the holding properties of the packaging tray 1 with respect to the LC panel 2 can be enhanced.

Subsequently, as shown in FIG. 1, a plurality of the packaging trays 1 each holding the LC panel 2 are stacked in layers. Note that the fixing sheet 5 is not illustrated in the drawing for the explanation's convenience.

Here, the bottom portion 11a of the position determining concave portion 11 of the upper packaging tray 1 slightly fits into the opening portion 11b of the corresponding position determining concave portion 11 of the lower packaging tray 1, whereby the stacking position of the upper packaging tray 1 with respect to the lower packaging tray 1 is determined fixedly.

At the same time, the panel pressing portions 12 of the upper packaging tray 1 press against the LC panel 2 held in the lower packaging tray 1 at a portion other than the effective display area A. The packaging trays 1 stacked in layers in the above manner are packed in a corrugated cardboard box or the like, and transported to the destination.

According to the above arrangement, since the position determining concave portions 11 are provided to each packaging tray 1 at a portion where the LC panel holding concave portion 3 is not formed (around the LC panel holding concave portion 3), the stacking position of the upper and lower packaging trays 1 is determined fixedly. Consequently, the stacked packaging trays 1 can be maintained in a stable manner, and are not displaced relative to each other due to the vibrations or the like during the transportation.

Thus, the occurrence of the sliding, chipping, cracking, etc. of the LC panels 2 held in the stacked packaging trays 1 caused by the displacement of the stacked packaging trays 1 during the transportation can be eliminated, and an increase in a non-conforming ratio can be suppressed, while the reliability of the packaging with the packaging trays 1 can be enhanced.

Since the bottom portion 11a of the position determining concave portion 11 does not fit into the opening portion 11b of the corresponding position determining concave portion 11 completely, the adhesion between the upper and lower packaging trays 1 is not so strong. Thus, the above arrangement makes it possible to determine the position of the packaging trays 1 in a secure manner while making the separation of the stacked packaging trays 1 easier. Consequently, the efficiency of the packaging job can be improved.

EMBODIMENT 2

Figure 6:
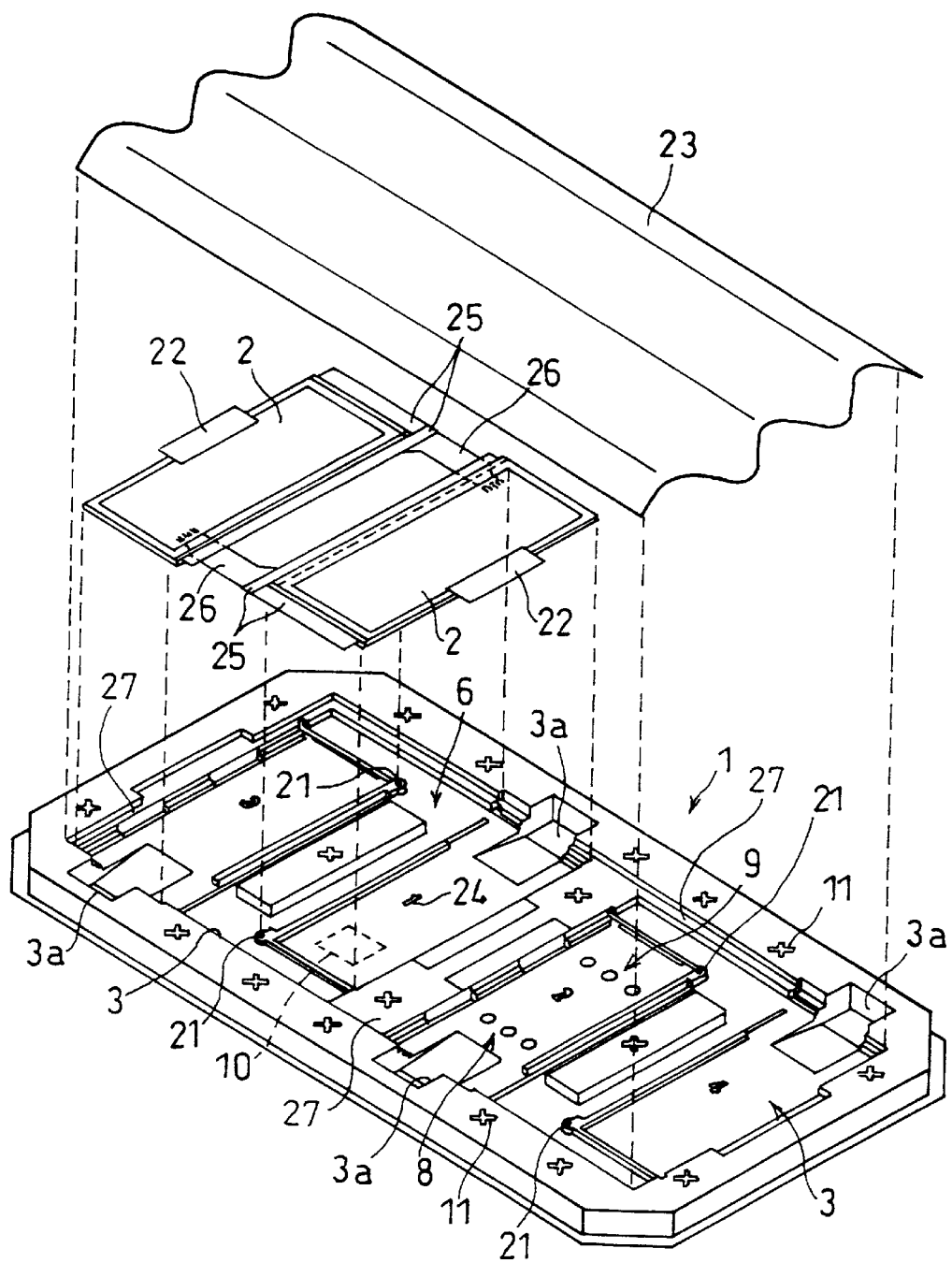
FIG. 6 is a perspective view of a packaging tray in accordance with another example embodiment of the present invention which can hold more than one LC panel.
Figure 7:
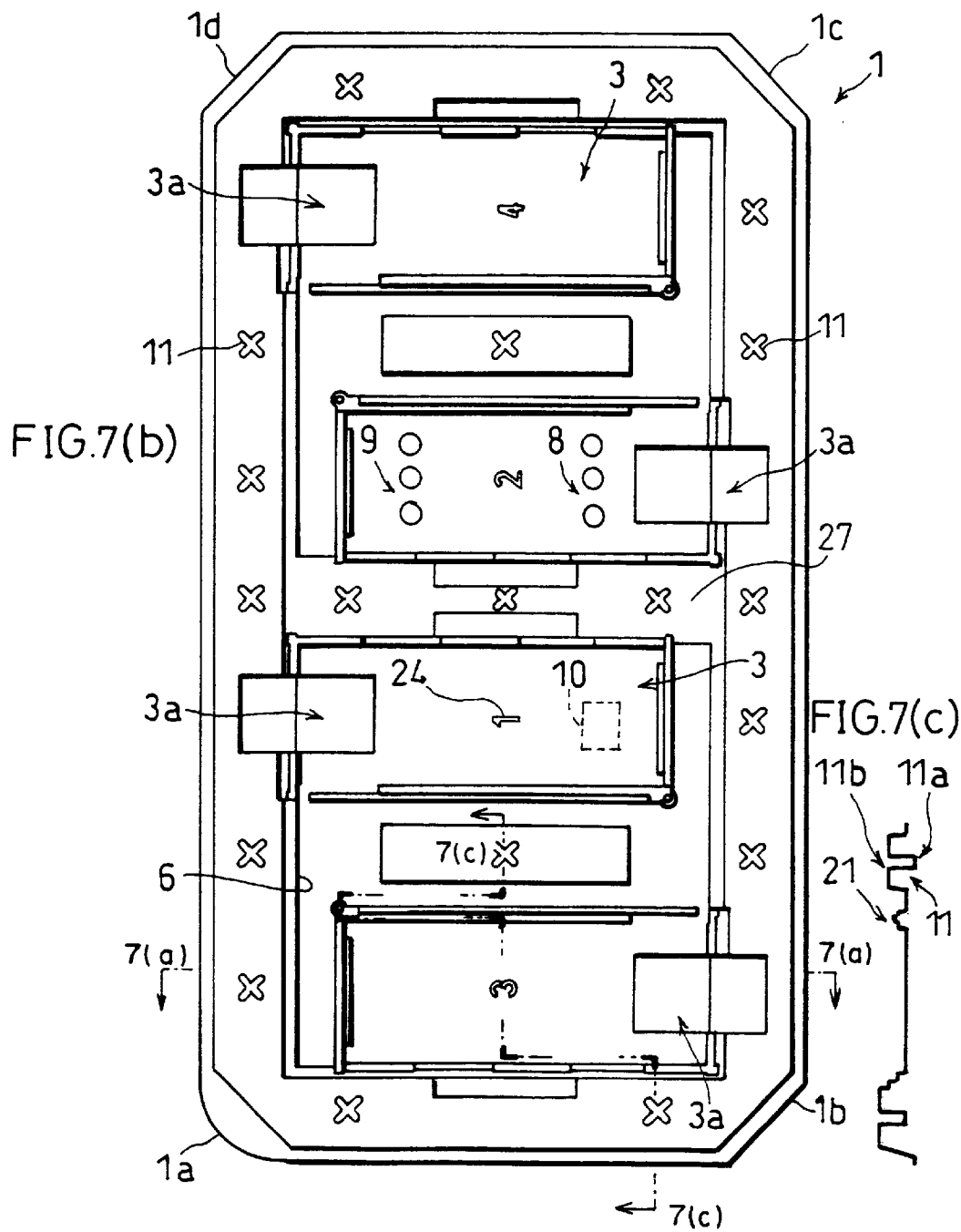
FIG. 7(a) is a sectional view taken on line 7(a)—7(a) of FIG. 7(b)
FIG. 7(b) is a plan (two places) view of the above packaging tray.
FIG. 7(c) is a sectional view taken on line 7(c)—7(c) of FIG. 7(b)
Figure 8:
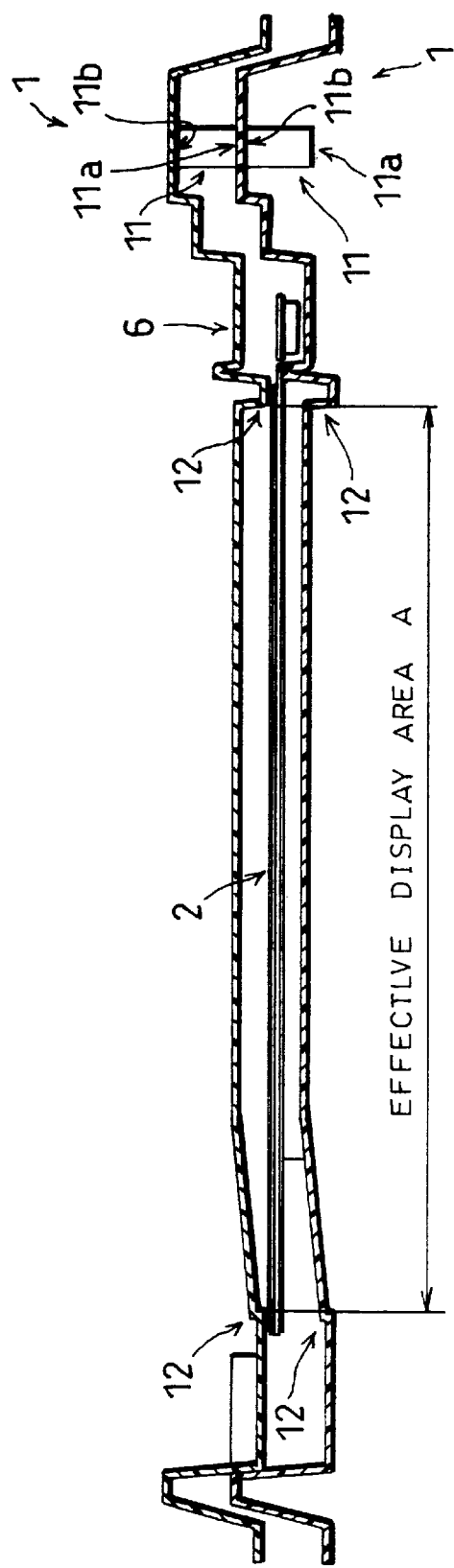
FIG. 8 is a cross section when the above packaging trays are stacked in layers.

Referring to FIGS. 6 through 8, the following as description will describe another example embodiment of the present invention. Hereinafter, like components are labeled with like reference numerals with respect to Embodiment 1, and the description of these components is not repeated for the explanation's convenience.

As shown in FIGS. 6 and 7(a) through 7(c), the packaging tray 1 of the present embodiment can hold a plurality of the LC panels 2. To be more specific, the packaging tray 1 includes two LC panel holding concave portions 3, each capable of holding two LC panels 2. It should be appreciated that the number of the LC panels 2 held by each LC panel holding concave portion 3, and the number of the LC panel holding concave portions 3 formed in the packaging tray 1 are not limited to the above specific values. In the present embodiment, the position determining concave portions 11 are formed around each LC panel holding concave portion 3 and a portion between the adjacent LC panels 2.

Each LC panel holding concave portion 3 includes the removing concave portions 3a for removing the LC panels 2 held therein at the positions corresponding to the positions of the LC panels 2. Each LC panel holding concave portion 3 also includes convex portions 21 for holding the LC panels 2 held therein at a portion other than the effective display areas A. The height of the convex portions 21 corresponds to the thickness of two laminated glass substrates forming the LC panel 2.

Thus, when the LC panel 2 is placed in the packaging tray 1 with one of its corners (the outside of the effective display area A) being stopped by the convex portion 21, the LC panel 2 can be held in the packaging tray 1 without being rattled. In addition, when the LC panel 2 is fixedly attached to the packaging tray 1 with a fixing tape 22, the occurrence of the cracking, chipping, separation, etc. of the LC panel 2 due to a vibration impact or dropping can be prevented in a secure manner.

To lessen an external impact on the LC panel 2, the LC panel 2 may be covered with a protection sheet 23 having cushioning properties. Alternatively, the fixing sheet (see FIG. 2) used in Embodiment 1 may be used instead of the protection sheet 23.

In the present embodiment, the sheet receiving portions 27 for receiving the fixing sheet 5 or protection sheet 23 are provided to the packaging tray 1 at a portion between the two LC panel holding concave portions 3 and along the edge of each LC panel holding concave portion 3. The sheet receiving portions 27 are provided in such a manner that their top surfaces come below the uppermost surface of the packaging tray 1, so that the fixing sheet 5 or protection sheet 23 covering the LC panel 2 does not protrude from the uppermost surface of the packaging tray 1. In this case, the fixing sheet 5 or protection sheet 23 can be a single sheet covering all the LC panels 2 held in one packaging tray 1. Hence, the number of the components can be reduced compared with a case where each LC panel 2 is separately covered with a sheet of a corresponding size.

Since the protection sheet 23 is a thin sheet made of a soft material and having a thickness of 0.5 mm or so, it does not cause any problem when the packaging trays 1 are stacked. To be more specific, when the packaging trays 1 are stacked in layers, the bottom portion 11a of the position determining concave portion 11 provided at a portion between the LC panels 2 in the upper packaging tray 1 presses the protection sheet 23, but this does not cause the rattling of the packaging tray 1.

Numerals 24, indicating the order according to which the LC panels 2 are placed in the packaging tray 1, are shown at the bottom of the peripheral component holding concave portion 6. Accordingly, one can place the LC panels 2 into the packaging tray 1 in accordance with the above order from inside to outside efficiently. In addition, a circuit board 25 and a flexible substrate 26 can be held in the peripheral component holding concave portion 6 at a portion between the adjacent LC panels 2.

The shape of the corners of the packaging tray 1 and other arrangements are identical with those explained in Embodiment 1.

In the above arrangement, when a plurality of LC panels 2 are placed in the packaging trays 1 to be transported, as shown in FIG. 6, the LC panels 2 are placed in the LC panel holding concave portions 3 with reference to the numerals 24 together with the circuit board 25 and flexible substrate 26. Here, each LC panel 2 is placed with its corner being stopped by the convex portion 21, and the LC panels 2 are attached fixedly to the packaging tray 1 with the fixing tape 22. Further, the LC panels 2 may be covered with the protection sheet 23 to improve the holding properties of the packaging tray 1 with respect to the LC panels 2.

Subsequently, as shown in FIG. 8, a plurality of the packaging trays 1, each holding a plurality of the LC panels 2, are stacked in layers. In the drawing, the protection sheet 23 is not illustrated for the explanation's convenience.

Here, the bottom portion 11a of the position determining concave portion 11 of the upper packaging tray 1 slightly fits into the opening portion 11b of the corresponding position determining concave portion 11 of the lower packaging tray 1, whereby the stacking position of the upper packaging tray 1 with respect to the lower packaging tray 1 is determined fixedly. At the same time, the panel pressing portions 12 of the upper packaging tray 1 press against the LC panels 2 held in the lower packaging tray 1 at a portion other than the effective display area A.

Consequently, the above arrangement can offer the same effects achieved by Embodiment 1. Since the packaging tray 1 of the present embodiment can hold a plurality of the LC panels 2, a large number of the LC panels 2 can be transported at a time, thereby improving the transportation efficiency of the LC panels 2.

EMBODIMENT 3

Figure 9:
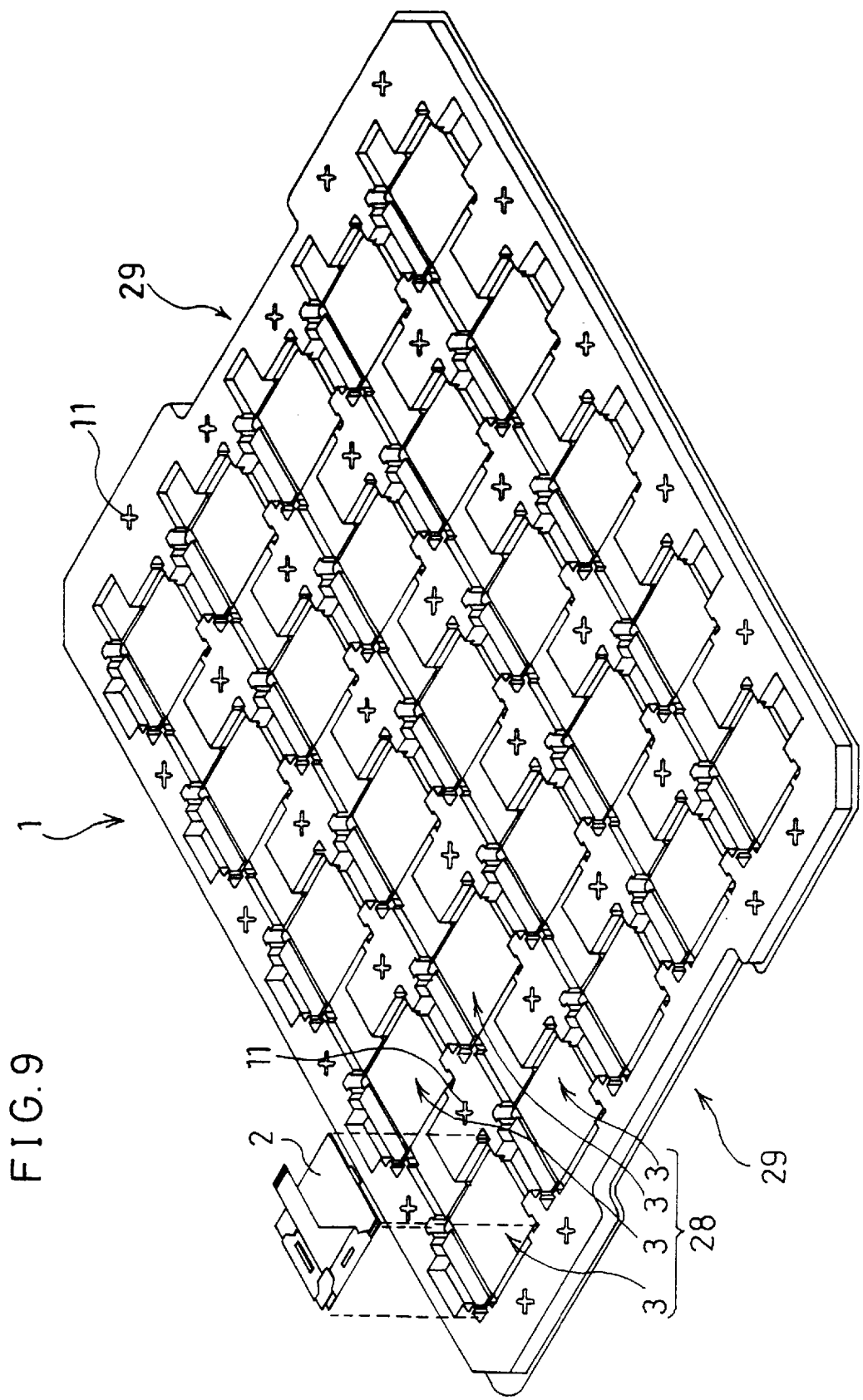
FIG. 9 is a perspective view schematically illustrating an arrangement of a packaging tray in accordance with still another example embodiment of the present invention which includes a matrix of LC panel holding concave portions.
Figure 10:
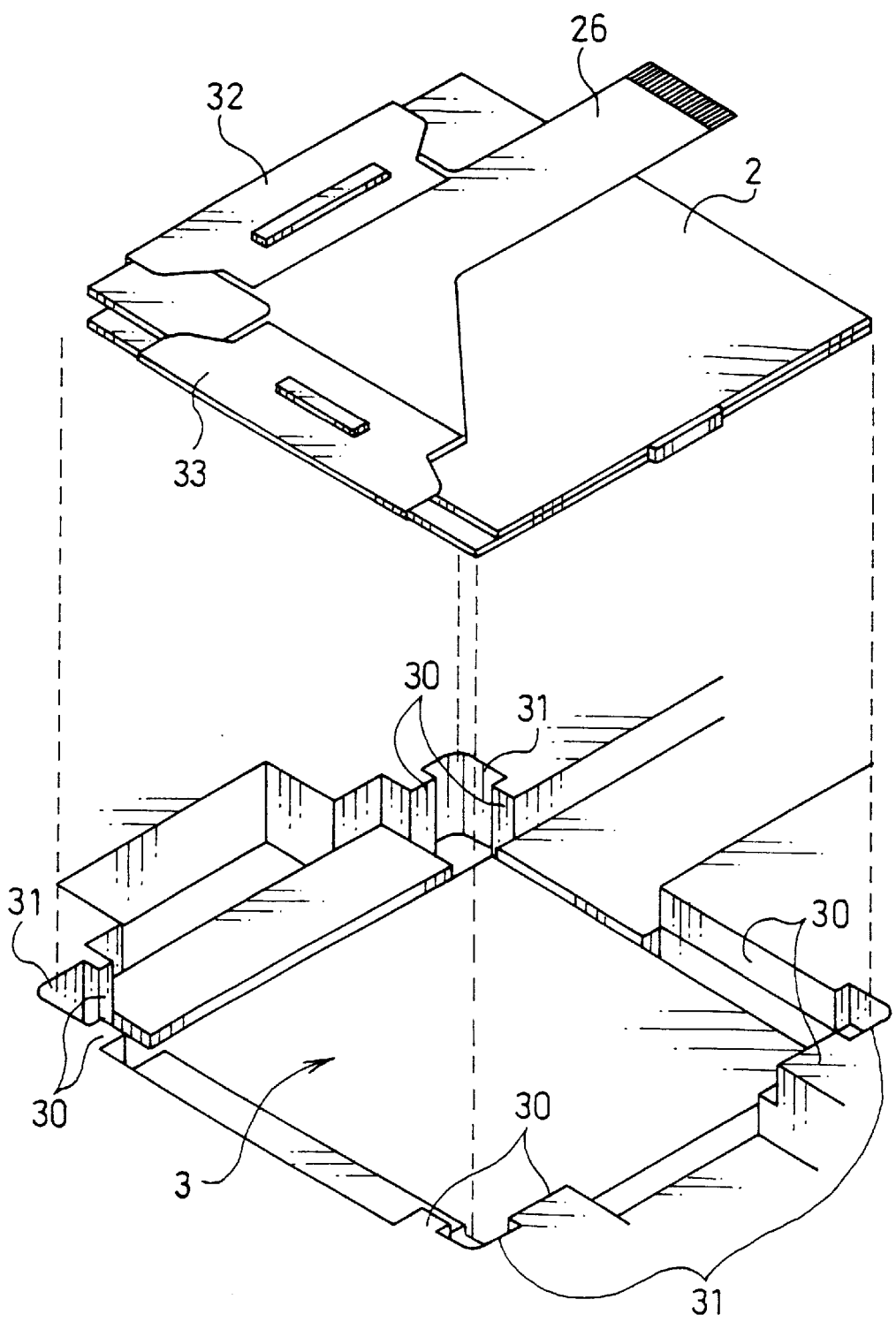
FIG. 10 is a perspective view illustrating one LC holding concave portion and an LC panel held therein in the above packaging tray.
Figure 11:
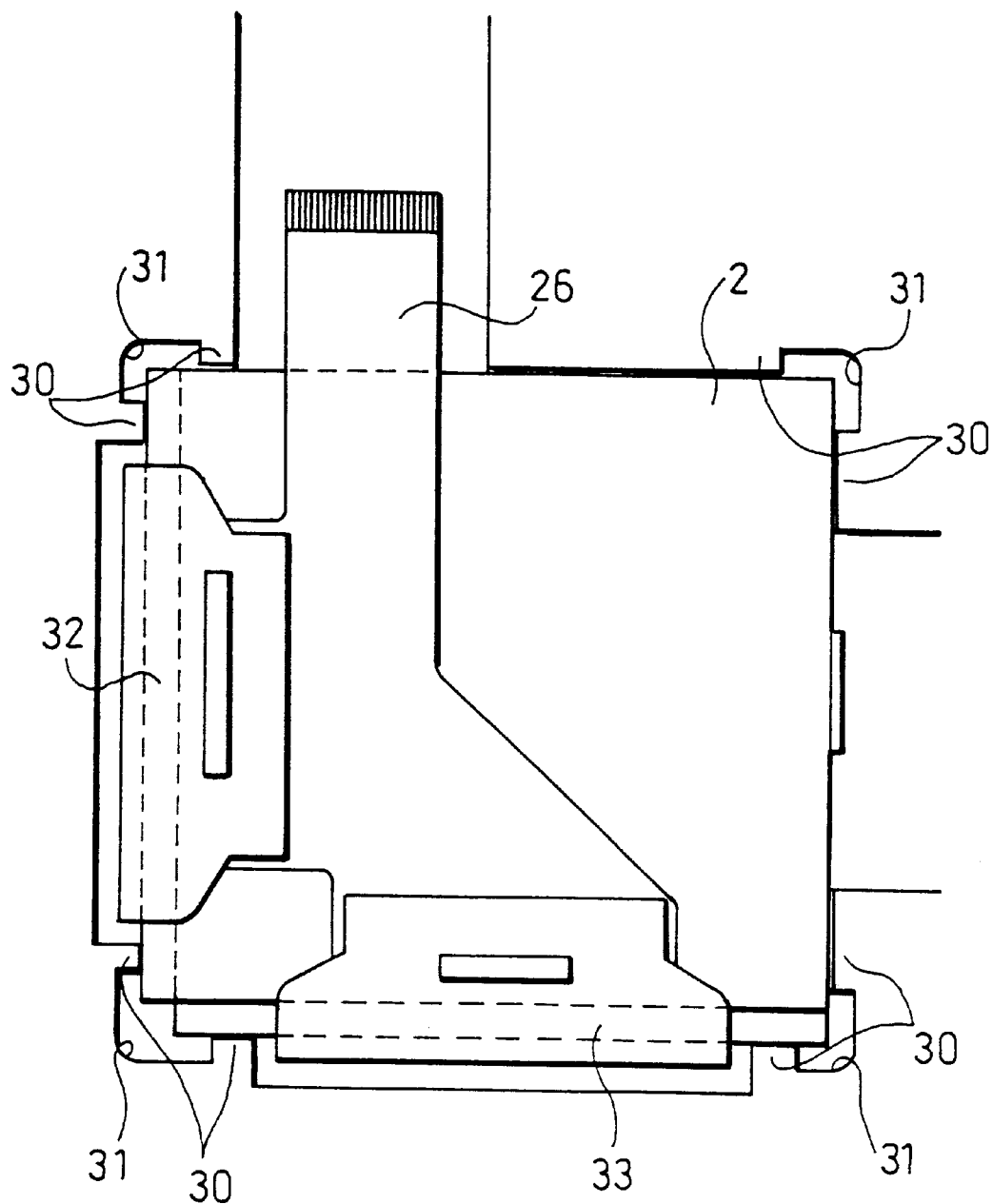
FIG. 11 is a plan view (two places) illustrating a state where the LC panel holding concave portion holds the LC panel.
Figure 13:
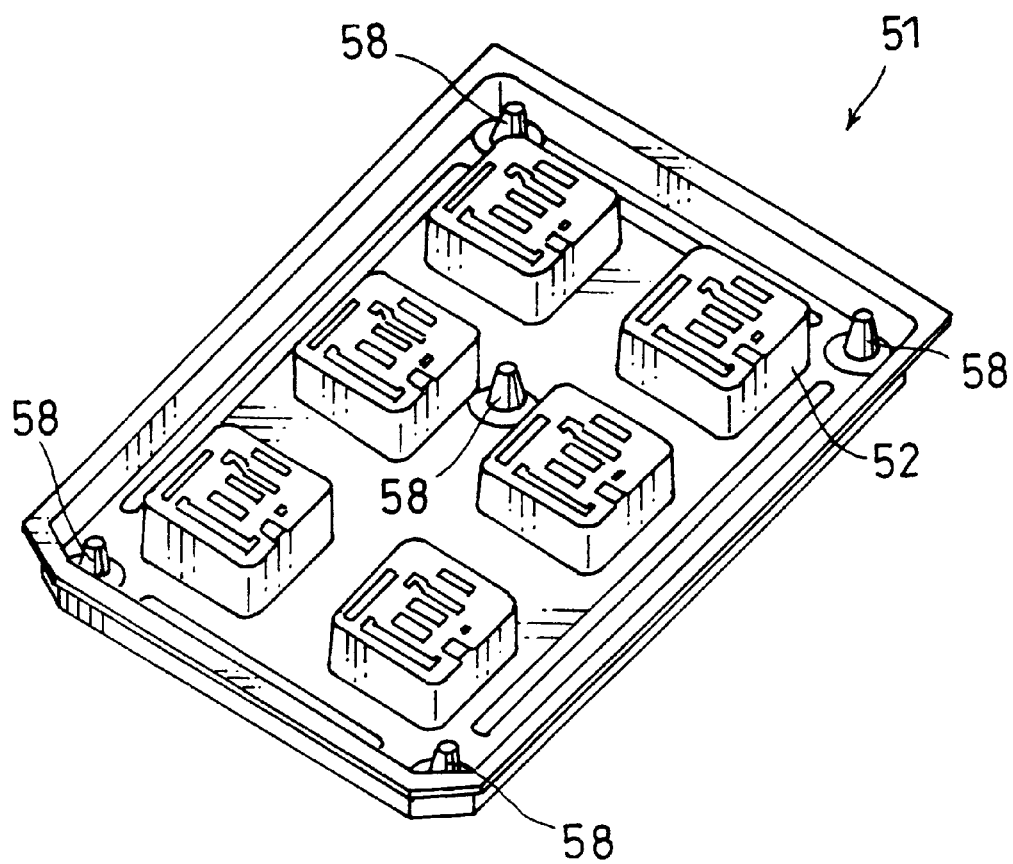
FIG. 13 is a perspective view of the back surface of the conventional packaging tray.
Figure 14:
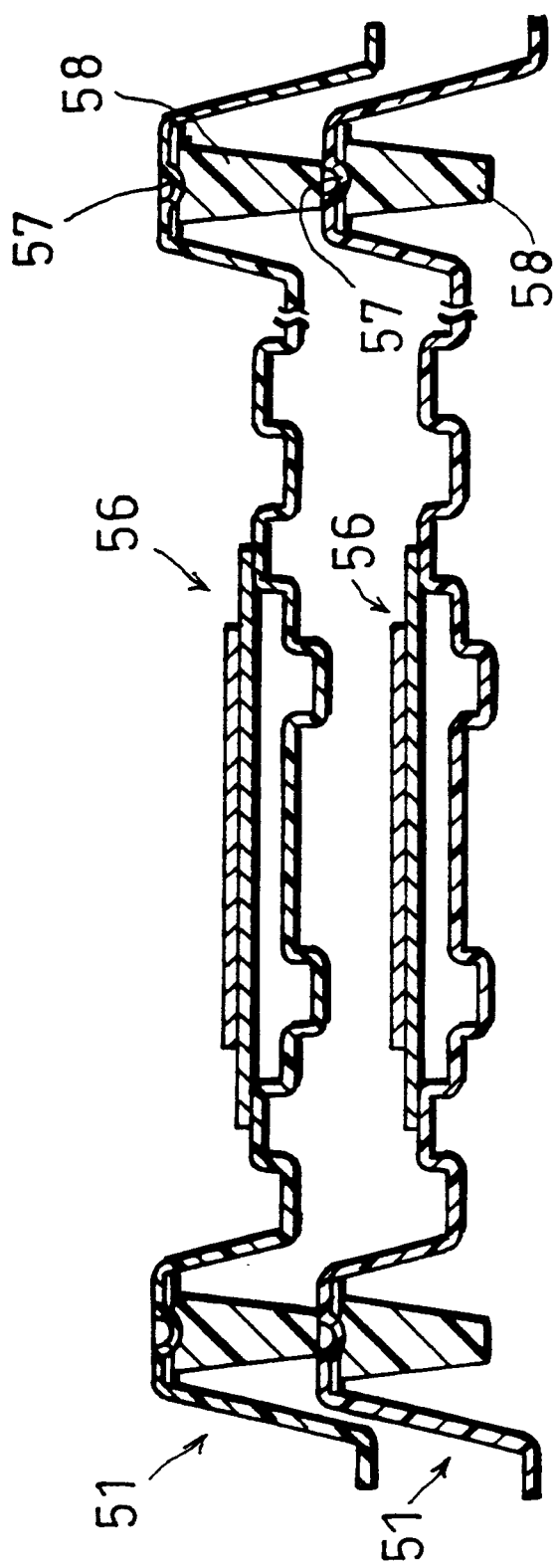
FIG. 14 is a cross section when the conventional packaging trays are stacked in layers.

Referring to FIGS. 9 through 11, the following description will describe still another example embodiment of the present invention. Hereinafter, like components are labeled with like reference numerals with respect to Embodiments 1 and 2, and the description of these components is not repeated for the explanation's convenience.

As shown in FIG. 9, each LC panel holding concave portion 3 holds one LC panel 2, and a plurality of the LC panel holding concave portions 3 are formed in a matrix alignment in the packaging tray of the present embodiment. The position determining concave portions 11 are provided along each side of the packaging tray 1 and at the center of each holding concave portion group 28 composed of 2×2=4 LC panel holding concave portions 3. The shape of the position determining concave portions 11 and other arrangements are identical with those explained in Embodiments 1 and 2.

Since the position determining concave portions 11 are provided in the inner portion of the packaging trays 1 in addition to near the sides of the same, the fixing and stabilizing properties of the packaging trays 1 stacked in layers can be further improved.

Gripping notches 29 are provided at one pair of opposing side surfaces of the packaging tray 1, which makes the transportation and stacking job of the packaging trays 1 easier. The gripping notches 29 also prevent the deformation of the packaging tray 1 due to an external impact, so that less stress is applied to the LC panels 2 held in the packaging tray 1.

A pair of the gripping notches 29 may have different lengths for the following reason. That is, the packaging trays 1, which can be stacked in layers, are of the same structure, and therefore, the packaging trays 1 must be aligned in the same direction when being stacked. If the packaging tray 1 is reversed left to right when it is stacked, the arrangements of the upper and lower packaging trays 1 are reversed as well. When this happens, the bottom portions 11a of the position determining concave portions 11 or the panel pressing portions 12 of the upper packaging tray 1 may touch the LC panels 2 held in the lower packaging tray 1, and possibly cause damage to the LC panels 2.

Thus, if the lengths of the notches are different, the right and left sides of the packaging tray 1 can be readily distinguished, and the packaging trays 1 will not be reversed left to right when being stacked. Thus, since the packaging trays 1 can be always stacked in a proper manner, the damages to the LC panels 2 caused when the packaging trays 1 are stacked with its left being reversed to right can be eliminated in a secure manner.

Next, the arrangement of the LC panel holding concave portion 3 in the present embodiment will be explained.

As shown in FIGS. 10 and 11, each LC panel holding concave portion 3 includes fixing protrusion portions 30 (display element fixing protrusion portions) which protrude from inner wall surfaces of the LC panel holding concave portion 3 and touch partially the side surfaces of the LC panel held therein. One fixing protrusion portion 30 for each side wall surface of the LC panel holding portion 3 is sufficient to achieve the intended effect, but two fixing protrusion portions 30 are Unprovided for each side wall surface in the present embodiment, so that the stability of the LC panels 2 held in the packaging tray 1 is further improved.

In the present embodiment, each fixing protrusion portion 30 is provided to touch the side surface of the LC panel 2 except for the corner and the vicinity thereof. Accordingly, a clearance portion 31 which does not touch the corner of the held LC panel 2 is formed at each corner of the LC panel holding concave portion 3.

When the fixing protrusion portions 30 and clearance portions 31 are formed in the above manner, the functions and effects as explained below are attained.

For example, there has been proposed an arrangement for forming a fixing protrusion to prevent the damages to a TCP (Tape Carrier Package) or a heat seal portion accompanying with the LC panel while forming the LC panel holding concave portion in such a manner to conform to the shape of the LC panel (for example, see the prior art column of Japanese Laid-open Patent Application No. 315487/1997 (Tokukaihei No. 9-315487)). However, according to this arrangement, since the side surfaces and the four corners of the LC panel are fixed, no clearance portion for an external impact is secured, and for this reason, the cracking, chipping, etc. of the LC panel occurred frequently. In particular, the corners of the LC panel is fragile to an impact, and most of the deficiency derives from the defects at the corners. Also, there is another inconvenience that, since the LC panel holding concave portion conforms to the shape of the LC panel, it is difficult to place/removed the LC panel into/from the LC panel holding concave portion.

By contrast, in the present embodiment, the fixing protrusion portions 30 are provided in the inner wall surfaces of the LC panel holding concave portions 3 to touch the side surfaces of the LC panel 2 except for the corners, thereby securing the clearance portions 31 at the corners of the LC panel holding concave portion 3. Thus, even if an external impact is applied to the packaging tray 1, the applied impact is not conveyed to the corners of the LC panel 2. Consequently, the damages to the corners of the LC panel 2 due to an external impact can be avoided in a secure manner, and the non-conforming ratio of the LC panels 2 can be reduced in a reliable manner. In addition, since the fixing protrusion portions 30 do not touch the TCP 32 or heat seal portion 33 accompanying with the LC panel 2 but touch the side surfaces of the LC panel 2 alone, an external impact is not conveyed to the TCP 32 or heat seal portion 33, either.

Further, when the LC panel holding concave portion 3 includes the fixing protrusion portions 30 which touch the side surfaces of the LC panel 2 partially as described above, an adequate space is provided between the LC panel 2 and the LC panel holding concave portion 3 at a portion other than the fixing protrusion portions 30, whereby the LC panel holding concave portion 3 does not conform to the shape of the LC panel 2. Consequently, the LC panels 2 can be readily placed into or removed from the LC panel holding concave portions 3, thereby enhancing the working efficiency.

In the present embodiment, the number of fixing protrusion portions 30 provided in each inner wall surface of the LC panel holding concave portion 3 is identical (two, herein), but the number can vary for each inner wall surface. Also, the position, an amount of protrusion from each inner wall surface, a touching width with respect to the LC panel 2 of the fixing protrusion portions 30 can be determined arbitrary, so that the LC panels 2 can be held in a stable manner.

It should be appreciated that the arrangement of forming the gripping notches 29, fixing protrusion portions 30, and clearance portions 31 is applicable to Embodiments 1 and 2 as well.

As has been explained, the packaging tray of the present invention may be arranged in such a manner that the position determining portion is made into a concave shape to protrude downward from the back surface of the packaging tray, and the bottom portion of the position determining portion is slightly smaller than the opening portion of the position determining portion.

According to the above arrangement, when a plurality of the packaging trays are stacked, the bottom portion of the position determining portion of the upper packaging tray slightly fits into the opening portion of the corresponding position determining portion of the lower packaging tray, whereby the upper packaging tray is fixed to the lower packaging tray at a predetermined position. It should be noted, however, that since the bottom portion of the position determining portion does not completely fit into the opening portion of the corresponding position determining portion, the adhesion between the upper and lower packaging trays can be maintained rather weak.

Thus, the above arrangement makes the separation of the stacked packaging trays easier while determining the stacking positions of the packaging trays in a secure manner. Consequently, the efficiency both in stacking and separating the packaging trays can be improved.

The packaging tray of the present invention may be arranged in such a manner that the position determining portion is made into a cross in a plan view.

According to the above arrangement, the bottom portion area of the position determining portion can be diminished as compared with a circular or triangular position determining portion of the same size. Consequently, the stacked packaging trays can be readily separated. On the other hand, the cross composed of four radial arm portions can prevent the displacement of the packaging trays, especially in the horizontal direction, in a secure manner. Hence, the position fixing properties of the packaging tray in the horizontal direction can be improved in a reliable manner.

In other words, the above arrangement allows the packaging tray to have the satisfactory readiness in separation and position fixing properties while improving the work efficiency in a reliable manner.

Also, the packaging tray of the present invention may be arranged in such a manner to further include a display element pressing portion for, when a plurality of the packaging trays are stacked, pressing against the display element held in the packaging tray placed beneath at a portion other than the effective display area.

According to the above arrangement, when a plurality of the packaging trays are stacked, the display element pressing portion of the upper packaging tray touches, and hence, presses against the display element held in the lower packaging tray. Consequently, the holding properties of the packaging tray with respect to the display element, especially, in the vertical direction, can be improved. Thus, the above arrangement makes it possible to eliminate the occurrence of defects of the display element during the transportation due to a vibration impact in the vertical direction, while improving the safety of the display element during the transportation.

Since the display element pressing portion presses against the display element at a portion other than the effective display area, for example, the polarizing plate placed within the effective display area is not damaged at all. Thus, the above arrangement makes it possible to maintain the display characteristics of the display element.

Also, the packaging tray of the present invention may be arranged in such a manner that the display element fixing protrusion portions protrude from the inner wall surfaces of the display element holding concave portion to touch the display element at the side walls except for the corners.

According to the above arrangement, the clearance portions, which do not touch the corners of the display element held in the display element holding concave portion, are secured at the corners of the display element holding concave portion. The corners of the display element are cracked or chipped frequently by an external impact. However, if the clearance portions are secured in the above manner, when an external impact is applied to the packaging tray, the applied impact is not conveyed to the corners of the display element held therein. Consequently, it becomes possible to prevent the damages to the corners of the display element due to an external impact in a reliable manner, thereby reducing a non-conforming ratio of the display element in a secure manner.

Also, since the display element fixing protrusion portions touch the side surfaces of the display element partially, an appropriate space is provided between the display element and the display element holding concave portion at a portion other than the display element fixing protrusion portions. Consequently, the display element can be readily placed into or removed from the display element holding concave portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A packaging tray holding at least one display element, said packaging tray being used in a system including a plurality of packaging trays where the plurality of packaging trays are stacked one upon another, said packaging tray having a plurality of sides and comprising:

at least one display element holding concave portion for holding one of the at least one display element;

a position determining portion provided near each side of said packaging tray for fixedly determining a stacking position of each packaging tray of the plurality of packaging trays with respect to at least one of other packaging trays placed above and beneath;

said position determining portion being made into a concave shape which protrudes downward from a back surface of said packaging tray and having a bottom portion and an opening portion, the bottom portion of said position determining portion being made slightly smaller than the opening portion thereof;

wherein the opening portion of a corresponding position determining portion of said at least one other packaging tray placed beneath and the bottom portion of said position determining portion of said each packaging tray are formed into such shapes so that the opening and bottom portions contact each other only on an edge line, where the edge line forms a corner portion of the opening portion; and wherein a contact portion of the bottom portion of said position determining portion with respect to the opening portion is cut diagonally.

2. A packaging tray holding at least one display element, said packaging tray being used in a system including a plurality of packaging trays where the plurality of packaging trays are stacked one upon another, said packaging tray having a plurality of sides and comprising:

at least one display element holding concave portion for holding one of the at least one display element;

a position determining portion provided near each side of said packaging tray for fixedly determining a stacking position of each packaging tray of the plurality of packaging trays with respect to at least one of other packaging trays placed above and beneath;

said position determining portion being made into a concave shape which protrudes downward from a back surface of said packaging tray and having a bottom portion and an opening portion, the bottom portion of said position determining portion being made slightly smaller than the opening portion thereof;

wherein the opening portion of a corresponding position determining portion of said at least one other packaging tray placed beneath and the bottom portion of said position determining portion of said each packaging tray are formed into such shapes so that the opening and bottom portions contact each other only on an edge line, where the edge line forms a corner portion of the opening portion; and wherein a cross section of said position determining portion is formed into a cruciform shape in cross section from the opening portion to the bottom portion.

3. A packaging tray holding a plurality of display elements, said packaging tray being used in a system including a plurality of packaging trays where the plurality of packaging trays are stacked one upon another, said packaging tray having a plurality of sides and comprising:

a plurality of display element holding concave portions, said each display element concave portion holding one of said plurality of display elements;

a position determining portion provided near each side of said packaging tray for fixedly determining a stacking position of each packaging tray of the plurality of packaging trays with respect to at least one of other packaging trays placed above and beneath;

a protection sheet for protecting at least one of said plurality of display elements; and a sheet receiving portion for supporting said protection sheet, wherein a height of said sheet receiving portion is set in such a manner that, when said protection sheet covers the display element, a top portion of said protection sheet does not come beyond an uppermost surface of said packaging tray.

4. A packaging tray holding at least one display element, said packaging tray being used in a system including a plurality of packaging trays where the plurality of packaging trays are stacked one upon another, said packaging tray having a plurality of sides and comprising:

a plurality of display element holding concave portions, said each display element concave portion holding a plurality of display elements;

a position determining portion provided near each side of said packaging tray for fixedly determining a stacking position of each packaging tray of the plurality of packaging trays with respect to at least one of other packaging trays placed above and beneath;

said position determining portion being made into a concave shape which protrudes downward from a back surface of said packaging tray and having a bottom portion and an opening portion, the bottom portion of said position determining portion being made slightly smaller than the opening portion thereof;

wherein the opening portion of a corresponding position determining portion of said at least one other packaging tray placed beneath and the bottom portion of said position determining portion of said each packaging tray are formed into such shapes so that the opening and bottom portions contact each other only on an edge line, where the edge line forms a corner portion of the opening portion;

wherein said each display element holding concave portion includes a convex portion for supporting the display element held therein at a portion other than an effective display area; and wherein a height of said convex portion is set correspondingly to a thickness of the display element.

5. A packaging tray holding at least one display element, said packaging tray being used in a system including a plurality of packaging trays where the plurality of packaging trays are stacked one upon another, said packaging tray having a plurality of sides and comprising:

at least one display element holding concave portion for holding one of the at least one display element;

a position determining portion provided near each side of said packaging tray for fixedly determining a stacking position of each packaging tray of the plurality of packaging trays with respect to at least one of other packaging trays placed above and beneath;

a display element pressing portion that presses against said one of the at least one display element held in said at least one other packaging tray placed beneath when a bottom portion of the position determining portion of said each packaging tray is brought into contact with an opening portion of the position determining portion of said at least one other packaging tray placed beneath;

said position determining portion being made into a concave shape which protrudes downward from a back surface of said packaging tray and having a bottom portion and an opening portion, the bottom portion of said position determining portion being made slightly smaller than the opening portion thereof;

wherein the opening portion of a corresponding position determining portion of said at least one other packaging tray placed beneath and the bottom portion of said position determining portion of said each packaging tray are formed into such shapes so that the opening and bottom portions contact each other only on an edge line, where the edge line forms a corner portion of the opening portion; and wherein said one of said at least one display element being held in the at least one display element holding concave portion is a liquid crystal display element, and said display element pressing portion presses against said one of said at least one display element on a portion other than an effective display area corresponding to a region where a polarizing plate included in the liquid crystal display element is provided.

6. A packaging tray holding at least one display element, said packaging tray being used in a system including a plurality of packaging trays where the plurality of packaging trays are stacked one upon another, said packaging tray having a plurality of sides and comprising:

at least one display element holding concave portion for holding one of the at least one display element;

a position determining portion provided near each side of said packaging tray for fixedly determining a stacking position of each packaging tray of the plurality of packaging trays with respect to at least one of other packaging trays placed above and beneath;

said position determining portion being made into a concave shape which protrudes downward from a back surface of said packaging tray and having a bottom portion and an opening portion, the bottom portion of said position determining portion being made slightly smaller than the opening portion thereof;

wherein the bottom portion of said position determining portion of said each packaging tray touches through one of point contact and linear contact the opening portion of the corresponding position determining portion of said at least one other packaging tray placed beneath;

a display element pressing portion that presses against said one of the at least one display element held in a lower packaging tray when a bottom portion of the position determining portion of an upper packaging tray is brought into contact with an opening portion of the position determining portion of the lower packaging tray;

wherein said one of said at least one display element being held in the at least one display element holding concave portion is a liquid crystal display element, and wherein said display element pressing portion presses against said one of said at least one display element on a portion other than an effective display area corresponding to a region where a polarizing plate included in the liquid crystal display element is provided.

* * * * *